United States Patent Office.

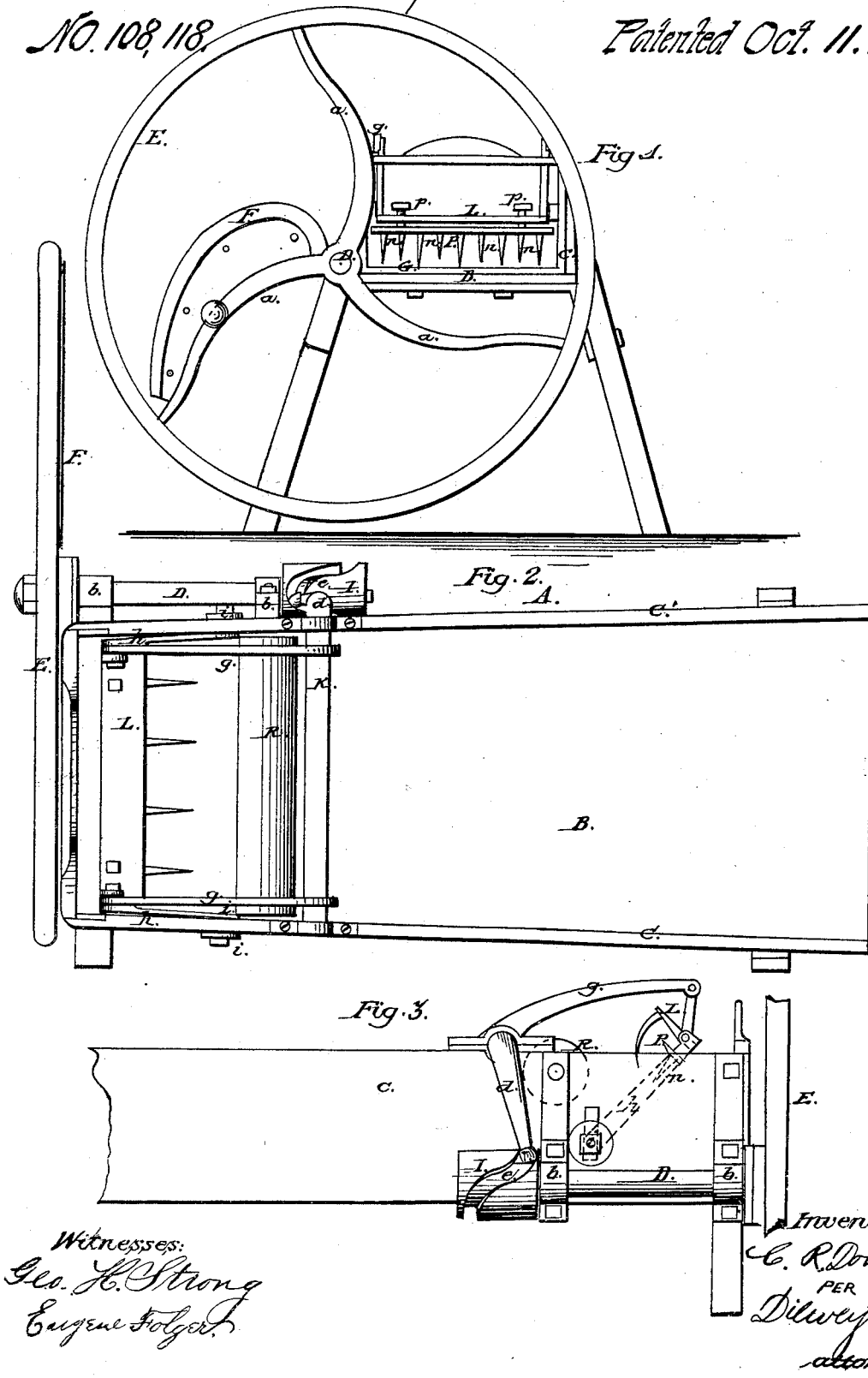

CARLES R. DONNER, OF SONORA, CALIFORNIA.

Letters Patent No. 108,118, dated October 11, 1870.

IMPROVEMENT IN FEED-CUTTERS.

The Schedule referred to in these Letters Patent and making part of the same.

*To all whom it may concern:*

Be it known that I, CARLES R. DONNER, of Sonora, in the county of Tuolumne and State of California, have invented an Improved Feed-cutting Box; and I do hereby declare the following description and accompanying drawing are sufficient to enable any person skilled in the art or science to which it most nearly appertains to make and-use my said invention or improvement, without further invention or experiment.

My invention relates to improvements in cutting-boxes for chopping straw and other fibrous substances, to be used principally for feeding horses and cattle; and It consists in placing at the end of the box a balance-wheel, which revolves on a shaft running parallel to the sides of the box.

The knife which cuts the straw or other substance is attached to one of the arms of the balance-wheel, and is carried around with it, cutting the straw between the knife and the cutting-edge of the box.

The straw passes under a roller in the box, and is fed to the knives by teeth, which, by a peculiar mechanism is caused to move it forward at each revolution of the balance-wheel and bring it under the knife.

In order to better illustrate my said invention, reference is had to the accompanying drawing forming a part of this specification of which—

Figure 1 is an end view.
Figure 2 is a top view.
Figure 3 is a side view.

Similar letters of reference in each of the figures indicate like parts.

A is the cutting-box, of the usual form, having the bottom B and two sides, C and C'.

Attached to the end of a shaft, D, running parallel to the sides of the box, is a balance-wheel, E, standing at right angles to the end of the box.

The wheel E is provided with arms *a a a*, which may be either straight or curved; but I prefer having them curved, for reasons which will be hereafter explained.

The knife F, which cuts the hay, straw, or other substance, as it is fed to it, is attached to one of these arms, so that, as the arm begins to descend, the straw will be caught between the point of the knife nearest the hub, and the square cutting-edge of a metal plate, G, which is attached to the bottom of the box, will cut toward the opposite side of the box as it descends, giving a drawing as well as a cutting motion, which greatly facilitates the work.

The knife F can be removed at pleasure, and will very seldom require sharpening, as the contact of the two cutting-edges will tend to keep it sharp.

The shaft D turns in boxes *b b*, secured to the side of the box, and has at its opposite end a cylinder, I, provided with a groove, *e*, in which the end of an arm, *d*, of the shaft K moves, the groove in the cylinder forming a cam, which operates the shaft.

The shaft K has two curved arms, *g g*, which extends forward toward the front end of the box, and to which is secured a metal bar, L, having short arms at each end, which are secured to the ends of the arms *g g*.

At each end of the bar L is a short axle, which turns in the end of a rod, *h*, the opposite end of which turns on a bolt, *i*, which passes through the side of the box.

This bolt passes through a vertical slot in the side, so that the end of the bar *h* may be raised or lowered when desired.

To the lower side of the metal bar L a plate, P, having the teeth *n n*, is attached by set-screws *p p*, by which it is raised and lowered, so as to bring the teeth nearer to or further from the bottom of the box.

The end of the arm *d* which operates in the groove or cam is provided with a small friction-roller, *r*.

The straw, or other fibrous substance which it is desired to cut, is first placed lengthwise in the box under the roller R, and so that the teeth on the plate P, as it descends, will catch the straw and throw it forward under the knife.

As the shaft D revolves, the arm *d* follows the groove or cam, and causes the shaft K to make a partial revolution, thus raising the bar L, and consequently the plate P, with its teeth, the bar *h* drawing them toward the rear of the box. As the revolution of the shaft D is completed, the shaft K moves back to its former position, lowering the plate P, the bar *h* giving it a thrust forward, which causes the teeth to move the straw under the knife.

By this means I have a box for cutting feed that will feed itself, all that is necessary being to place the straw in the box and turn the wheel. The knife which cuts the straw will not often require sharpening, as its contact with the steel plate on the box will tend to keep it in good condition.

Having thus described my invention,

What I claim, and desire to secure by Letters Patent, is—

The combination, with the shaft K, having the arms *g g* and the arm *d*, working in the groove or cam *e*, of the bar L, rods *h*, and adjustable toothed plate P, when arranged to operate substantially as and for the purpose described.

CARLES R. DONNER. [L. S.]

Witnesses:
CHARLES RICHBER,
J. J. WAGNER.